United States Patent
Iizuka et al.

(10) Patent No.: US 12,078,717 B2
(45) Date of Patent: Sep. 3, 2024

(54) SENSOR

(71) Applicant: Panasonic Intellectual Property Management Co., Ltd., Osaka (JP)

(72) Inventors: Shoichi Iizuka, Osaka (JP); Takeshi Nakayama, Hyogo (JP); Naoki Honma, Iwate (JP); Kentaro Murata, Iwate (JP); Kazuki Numazaki, Iwate (JP); Nobuyuki Shiraki, Iwate (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 363 days.

(21) Appl. No.: 17/619,844

(22) PCT Filed: May 31, 2021

(86) PCT No.: PCT/JP2021/020659
§ 371 (c)(1),
(2) Date: Dec. 16, 2021

(87) PCT Pub. No.: WO2022/004231
PCT Pub. Date: Jan. 6, 2022

(65) Prior Publication Data
US 2022/0350014 A1 Nov. 3, 2022

(30) Foreign Application Priority Data

Jun. 30, 2020 (JP) ................................ 2020-112997

(51) Int. Cl.
*G01S 13/88* (2006.01)
*G06M 11/00* (2006.01)

(52) U.S. Cl.
CPC ............. *G01S 13/88* (2013.01); *G06M 11/00* (2013.01)

(58) Field of Classification Search
CPC . G01S 13/88; G01S 7/41; G01S 13/46; G01S 7/415; G01S 7/417; G01S 7/414;
(Continued)

(56) References Cited

U.S. PATENT DOCUMENTS

2008/0001821 A1  1/2008 Tanaka
2018/0192919 A1* 7/2018 Nakayama ............ A61B 5/1116
(Continued)

FOREIGN PATENT DOCUMENTS

JP      2001-108734 A    4/2001
JP         5025170 B2    9/2012
(Continued)

OTHER PUBLICATIONS

International Search Report and Written Opinion issued on Jul. 13, 2021 in International Patent Application No. PCT/JP2021/020659.
(Continued)

*Primary Examiner* — Bernarr E Gregory
*Assistant Examiner* — Hailey R Le
(74) *Attorney, Agent, or Firm* — Rimon P.C.

(57) ABSTRACT

A sensor includes: a complex transfer function calculator calculating complex transfer functions; a living body component extractor extracting living body information; a correlation matrix calculator calculating a target correlation matrix from the living body information; a noise information storage recording a noise correlation matrix; a first headcount information calculator calculating first headcount information that is a tentative number of persons present in the predetermined space, based on the target correlation matrix and a threshold calculated from the noise correlation matrix; a MUSIC spectrum calculator estimating position candidates for the living bodies, using the target correlation matrix, and outputting likelihood spectra indicating likelihoods of the respective living bodies being present in corresponding positions; and a second headcount information calculator estimating second headcount information that is a more accurate number of living bodies or positions from position information that is based on the likelihood spectra and can include the position candidates.

7 Claims, 13 Drawing Sheets

(58) Field of Classification Search
CPC ........ G01S 13/42; G01S 13/52; G01S 13/878; G01S 13/003
See application file for complete search history.

(56) References Cited

U.S. PATENT DOCUMENTS

| | | | |
|---|---|---|---|
| 2019/0164008 A1* | 5/2019 | Yahata | ............... G06T 5/70 |
| 2019/0195997 A1 | 6/2019 | Iizuka et al. | |
| 2020/0011986 A1* | 1/2020 | Yamanouchi | ........... G01S 13/42 |

FOREIGN PATENT DOCUMENTS

| | | |
|---|---|---|
| JP | 5047002 B2 | 10/2012 |
| JP | 2014-228291 A | 12/2014 |
| JP | 2015-117972 A | 6/2015 |
| JP | 2019-117055 A | 7/2019 |
| WO | 2006/030834 A1 | 3/2006 |

OTHER PUBLICATIONS

Kazuki Numazaki, et al., "Estimating Number of Targets Using Music Spectrum of Bistatic MIMO Radar", IEICE Technical Report, vol. 119, No. 228, AP2019-105, pp. 137-142, Oct. 2019; with English translation of Abstract.

* cited by examiner

SENSOR

TECHNICAL FIELD

The present disclosure relates to a sensor.

BACKGROUND ART

A technology has been developed that uses wirelessly transmitted signals to detect a target object (for example, see Patent Literature (PTL) 1).

PTL 1 discloses the capability of analyzing the eigenvalues corresponding to Doppler shift components included in wirelessly received signals, using Fourier transform to know the number and positions of living bodies to be detected.

CITATION LIST

Patent Literature

[PTL 1] Japanese Unexamined Patent Application Publication No. 2015-117972
[PTL 2] Japanese Unexamined Patent Application Publication No. 2014-228291
[PTL 3] Japanese Patent No. 5047002
[PTL 4] Japanese Patent No. 5025170
[NPL 1] "Baisutatikku MIMO reda ni okeru MUSIC supekutoramu ni motoduita ninzu suitei houhou [Estimating Number of Targets Using MUSIC Spectrum of Bistatic MIMO Radar]", Institute of Electronics, Information and Communication Engineers (IEICE) technical report, AP2019-105, pp. 137-142

SUMMARY OF INVENTION

Technical Problem

However, the technology disclosed in PTL 1 has a problem that the accuracy of estimating the number and positions of persons decreases with frequent changes in the number of detection targets.

The present disclosure has been conceived in view of the above circumstances, and its aim is to provide a sensor capable of estimating the number and positions of living bodies over a broader area by use of wireless signals.

Solution to Problem

To achieve the foregoing object, the sensor according to an aspect of the present invention is a sensor that estimates a total number of living bodies. Such sensor includes: a complex transfer function calculator that calculates complex transfer functions from reception signals that are signals transmitted in a predetermined space from a transmission device including N transmission antenna elements, where N is a natural number greater than or equal to 2, and received during a predetermined period by M reception antenna elements, where M is a natural number greater than or equal to 2; a variation component extractor that extracts living body information that is a variation component in the predetermined space; a correlation matrix calculator that calculates a target correlation matrix from the living body information extracted by the variation component extractor; a noise information storage that records a noise correlation matrix measured in the predetermined space; a first headcount information calculator that calculates first headcount information that is a tentative value of the total number of living bodies that are present in the predetermined space, based on the target correlation matrix and a threshold calculated from the noise correlation matrix; a likelihood spectrum calculator that estimates a plurality of candidates for positions of the living bodies by a predetermined position estimation method, using the first headcount information and the target correlation matrix, and outputs likelihood spectra indicating likelihoods of the respective living bodies present in corresponding ones of the positions; and a second headcount information calculator that estimates, by a predetermined method, second headcount information or positions from position information that is based on the likelihood spectra and can include the plurality of candidates for the positions, the second headcount information being a more accurate number of living bodies.

Advantageous Effects of Invention

The sensor according to the present disclosure is capable of more accurate estimation of the number of living bodies by use of wireless signals.

DESCRIPTION OF EMBODIMENTS

Figure 1:
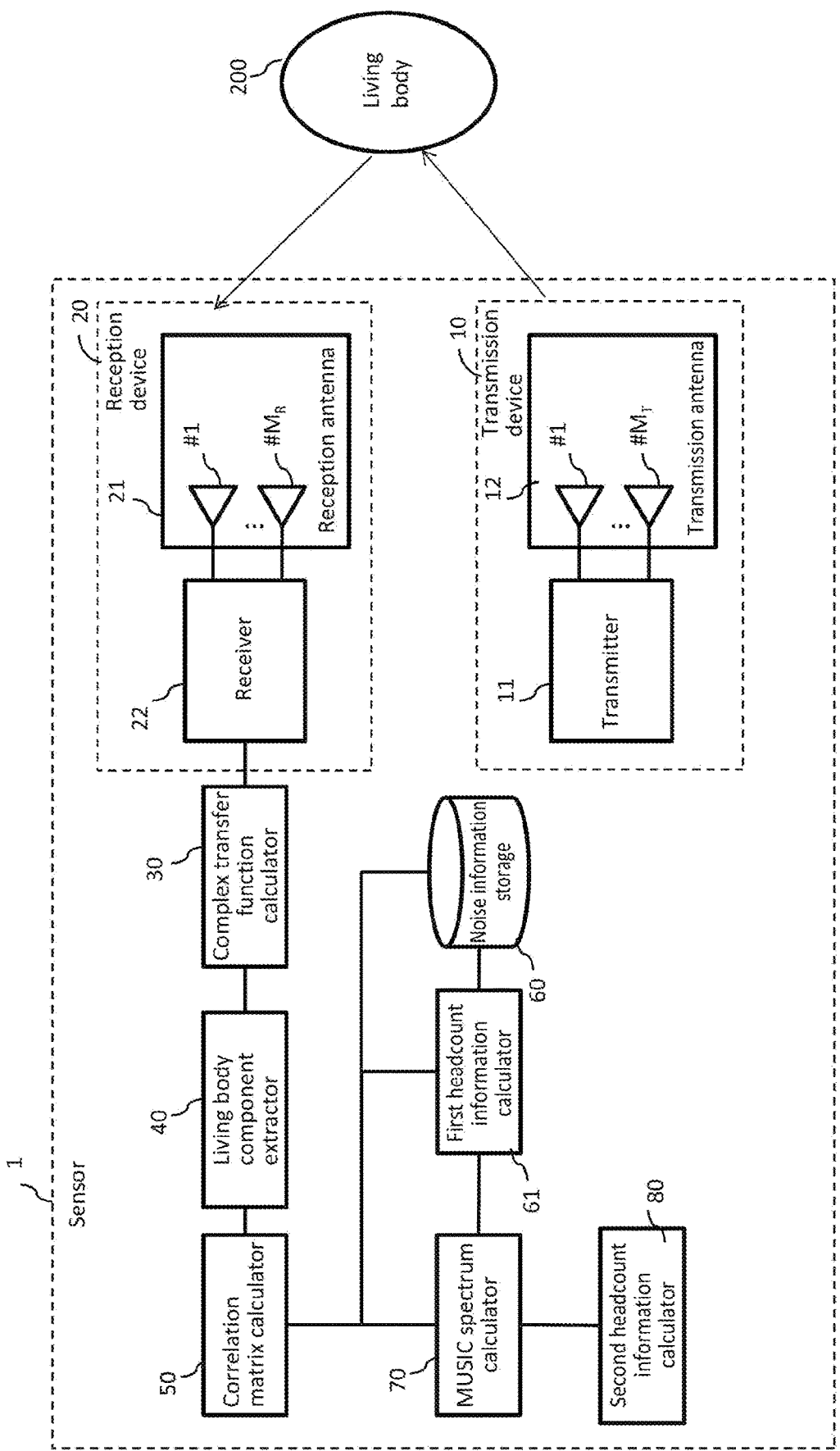
FIG. 1 is a block diagram showing the configuration of a sensor according to Embodiment 1.

Underlying Knowledge Forming Basis of the Present Invention

Technologies have been developed of detecting a target object, using wirelessly transmitted signals (see, for example, PTL 1 to PTL 4, and NPL 1).

For example, PTL 1 discloses a technology of estimating the number and positions of persons to be detected by analyzing the eigenvalues corresponding to Doppler shift components, using Fourier transform. More specifically, Fourier transform is performed on reception signals, an autocorrelation matrix of waveforms of specific frequency components extracted is determined, and eigenvalues are obtained by eigenvalue decomposition on such autocorrelation matrix. In general, an eigenvalue and an eigenvector each indicate a propagation channel, i.e., a single path, through which radio waves propagate from a transmission antenna to a reception antenna. However, the technology disclosed in PTL 1 removes components that do not include living body information. As such, only a path corresponding to a signal reflected by a living body, a path corresponding to the secondary reflection of such signal, and a path corresponding to noise appear in eigenvalues and eigenvectors. Here, the values of eigenvalues corresponding to noise are smaller than the values of eigenvalues corresponding to a living body. It is thus possible to estimate the number of living bodies by counting the number of ones of such eigenvalues that are larger than a predetermined threshold.

However, the technology disclosed in PTL 1 has the problem as described below. That is to say, when a target living body is present in a relatively distant location, or when a relatively large number of living bodies is present, a difference in the eigenvalues between the living bodies and noise becomes small. This results in a reduced accuracy of estimating the number of persons. This is because, when the Doppler effect is extremely weak, the estimation of the number of persons is affected by: internal noise of the reception device or interference waves from an object other than target objects to be detected; and the presence of an object, other than the target objects, that generates a Doppler shift. These effects make it hard to detect feeble signals having a Doppler shift. Also, the size of a living body to be measured is relatively large and living body components are distributed, spanning a plurality of eigenvalues. As such, when a relatively large number of living bodies is present, the eigenvalues of the living bodies cannot be completely separated from one another, which makes it hard to estimate the number of persons.

PTL 2 and NPL 1 disclose technologies of estimating the position of a target object, using a direction estimation algorithm such as MUltiple SIgnal Classification (MUSIC). More specifically, a receiving station that has received signals from a transmitting station performs Fourier transform on the received signals, determines an autocorrelation matrix of waveforms of specific frequency components extracted, and applies a direction estimation algorithm such as MUSIC method. This achieves direction estimation with higher accuracy. However, MUSIC method used in PTL 2 requires a preliminary entry of the number of living bodies to be detected. The inventors have realized that the detection technology of PTL 2 requires an estimation of the number of persons beforehand. Also, the technology disclosed in NPL 1 requires an appropriate setting of first headcount information, which is a tentative value of the number of persons who are present in a space. However, while an optimal value of the first headcount information varies depending on environment and the number of persons in the space, the method disclosed in NPL 1 fails to support changing to follow the optimal value.

Another example is PTL 3 that discloses a technology of estimating the number of incoming waves, i.e., the number of transmission devices such as mobile phones, from a correlation between eigenvectors of reception signals received by a plurality of antennas and steering vectors in a range at which radio waves can arrive.

Further another example is PTL 4 that discloses a technology of estimating the number of incoming waves by: using steering vectors to calculate evaluation functions for a various number of incoming waves given for reception signals received by a plurality of antennas; and estimating that the number of incoming waves with the maximum evaluation function is a true number of incoming waves.

However, the inventors have realized that the technologies disclosed in PTL 3 and PTL 4 are intended for estimating the number of transmission devices that emit radio waves, and thus cannot estimate the number of living bodies.

In view of the above, the inventors have arrived at an invention of a sensor capable of estimating a larger number of living bodies with higher accuracy using wireless signals, without requiring target living bodies to have a special device such as a transmission device.

In other words, the sensor according to an aspect of the present disclosure is a sensor that estimates a total number of living bodies. Such sensor includes: a complex transfer function calculator that calculates complex transfer functions from reception signals that are signals transmitted in a predetermined space from a transmission device including N transmission antenna elements, where N is a natural number greater than or equal to 2, and received during a predetermined period by M reception antenna elements, where M is a natural number greater than or equal to 2; a variation component extractor that extracts living body information that is a variation component in the predetermined space; a correlation matrix calculator that calculates a target correlation matrix from the living body information extracted by the variation component extractor; a noise information storage that records a noise correlation matrix measured in the predetermined space; a first headcount information calculator that calculates first headcount information that is a tentative value of the total number of living bodies that are present in the predetermined space, based on the target correlation matrix and a threshold calculated from the noise correlation matrix; a likelihood spectrum calculator that estimates a plurality of candidates for positions of the living bodies by a predetermined position estimation method, using the first headcount information and the target correlation matrix, and outputs likelihood spectra indicating likelihoods of the respective living bodies present in corresponding ones of the positions; and a second headcount information calculator that estimates, by a predetermined method, second headcount information or positions from position information that is based on the likelihood spectra and can include the plurality of candidates for the positions, the second headcount information being a more accurate number of living bodies.

With this configuration, it is possible to determine, from the shape of the likelihood spectra, whether peaks in the spectra are true peaks, even when living body components are superimposed on eigenvalues on which only noise is supposed to remain by separation. This thus improves the accuracy of estimating the number of persons.

When the signal-to-noise ratio is small, such as when a living body is at a distant location, it is difficult to distinguish, on the basis of a threshold, eigenvalues corresponding to the living body from eigenvalues corresponding noise by use of a method utilizing eigenvalues. Also, the size of a living body to be measured is relatively large and living body components are distributed, spanning a plurality of eigenvalues. As such, when a relatively large number of living bodies is present, the eigenvalues corresponding to the living bodies cannot be completely separated from one another, which makes it difficult to estimate the number of persons.

In view of the above, the present invention calculates likelihood spectra using a tentative value as first headcount information, which is the number of persons whose positions are measurable and which can be determined from the number of antenna elements of the sensor and the environment in which the sensor is disposed. For this reason, the number of persons who are really present in a detection range and the first headcount information used for the calculation of likelihood spectra can be different.

Typical likelihood spectra are MUSIC spectra obtained by MUSIC method, and thus the following describes MUSIC spectra as representative likelihood spectra. In MUSIC method, when the first headcount information is smaller than the number of persons who are really present, the number of peaks in MUSIC spectra is smaller than the number of persons who are really present. As such MUSIC method fails to estimate a complete number of persons. Also, MUSIC spectra exhibit peaks known as virtual images that appear in locations where no living body is actually present, when the first headcount information is greater than the number of persons who are really present. However, the present inventors have found that virtual images have characteristics such as that the height of their peaks is relatively low and relatively gentle. In view of this, the present inventors have found that highly accurate estimation of the number of persons is achievable by: making a determination on the peak values in MUSIC spectra on the basis of a threshold; making a determination on the basis of a ratio among the peak values; and making a determination by machine learning to identify virtual images and count the number of true peaks.

Note that the present disclosure can be implemented not only as a device, but also as an integrated circuit that includes the processing units included in such device, a method that includes as its steps the processing units included in the device, a program that causes a computer to execute these steps, and information, data, or signals that represent such program. Also, such program, information, data, and signals may be distributed in a recording medium such as a CD-ROM, or via a communication medium such as the Internet.

Hereinafter, certain exemplary embodiments are described in greater detail with reference to the accompanying Drawings. Each of the exemplary embodiments described below shows preferred example of the present disclosure. The numerical values, shapes, materials, elements, the arrangement and connection of the elements, steps, the processing order of the steps etc. shown in the following exemplary embodiments are mere examples, and therefore do not limit the present disclosure. Therefore, among the elements in the following exemplary embodiments, those not recited in any one of the independent claims are described as optional elements included in a more preferred embodiment. Also, in the specification and the drawings, elements having substantially the same functional configuration are assigned the same reference marks and are not described to avoid redundancy.

Embodiment 1

With reference to the drawings, the following describes a method, etc. of estimating the number of persons performed by sensor 1 according to Embodiment 1.

[Configuration of Sensor 1]

FIG. 1 is a block diagram showing the configuration of sensor 1 according to Embodiment 1. Sensor 1 shown in FIG. 1 includes transmission device 10, reception device 20, complex transfer function calculator 30, living body component extractor 40, correlation matrix calculator 50, noise information storage 60, first headcount information calculator 61, MUSIC spectrum calculator 70, and second headcount information calculator 80.

[Transmission Device 10]

Transmission device 10 includes a transmission antenna. More specifically, as shown in FIG. 1, transmission device 10 includes transmitter 11 and transmission antenna 12.

Transmission antenna 12 includes an antenna array including $M_T$ elements, an example of which is a four-element patch array antenna with half-wavelength spacing between array element antennas.

Transmitter 11 generates high-frequency signals used to estimate the presence/absence of living body 200, the number and positions of living bodies. For example, transmitter 11 generates 2.4 GHz continuous waves (CWs), and transmits the generated CWs from transmission antenna 12 as transmission waves. Note that the signals to be transmitted are not limited to CWs, and thus may be modulated signals such as signals that have undergone Orthogonal Frequency Division Multiplexing (OFDM).

[Reception Device 20]

Reception device 20 includes reception antenna 21 and receiver 22.

Reception antenna 21 includes an array antenna including $M_R$ elements. Reception antenna 21 is, for example, a four-element patch array antenna with half-wavelength spacing between array element antennas. Reception antenna 21 receives the high-frequency signals by the array antenna.

Using a downconverter, for example, receiver 22 converts the high-frequency signals received by reception antenna 21 into signal-processable low-frequency signals. When transmission device 10 transmits modulated signals, receiver 22 also demodulates the modulated signals. Receiver 22 transfers, to complex transfer function calculator 30, the low-frequency signals obtained by the conversion.

Note that the present embodiment uses 2.4 GHz as an exemplary frequency range, but may use any frequencies such as 5 GHz or millimeter-wave range.

[Complex Transfer Function Calculator 30]

Complex transfer function calculator 30 calculates, from the signals observed at the array antenna of reception antenna 21, complex transfer functions that represent the propagation characteristics between such array antenna and transmission antenna 12 of transmission device 10. More specifically, complex transfer function calculator 30 calculates, from a low-frequency signal transferred from receiver 22, a complex transfer function representing the propagation characteristics between each of $M_T$ transmission antenna elements included in transmission antenna 12 and each of $M_R$ reception antenna elements included in reception antenna 21. Note that complex transfer functions calculated by complex transfer function calculator 30 can include reflected waves or scattered waves, which are part of the transmission waves from transmission antenna 12 reflected or scattered by living body 200 as signals. Also note that complex transfer functions calculated by complex transfer function calculator 30 can also include reflected waves that are transferred without going via living body 200, such as direct waves from transmission antenna 12 and reflected waves from a fixed object. The amplitude and phase of signals reflected or scattered by living body 200, i.e., reflected waves and scattered waves transferred via living body 200, constantly change due to activities of living body 200 such as breathing and heartbeat, as well as noise included in the space, transmission device 10, and reception device 20. Noise included in the space, transmission device 10, and reception device 20 is hereinafter referred to simply as noise.

Figure 2:
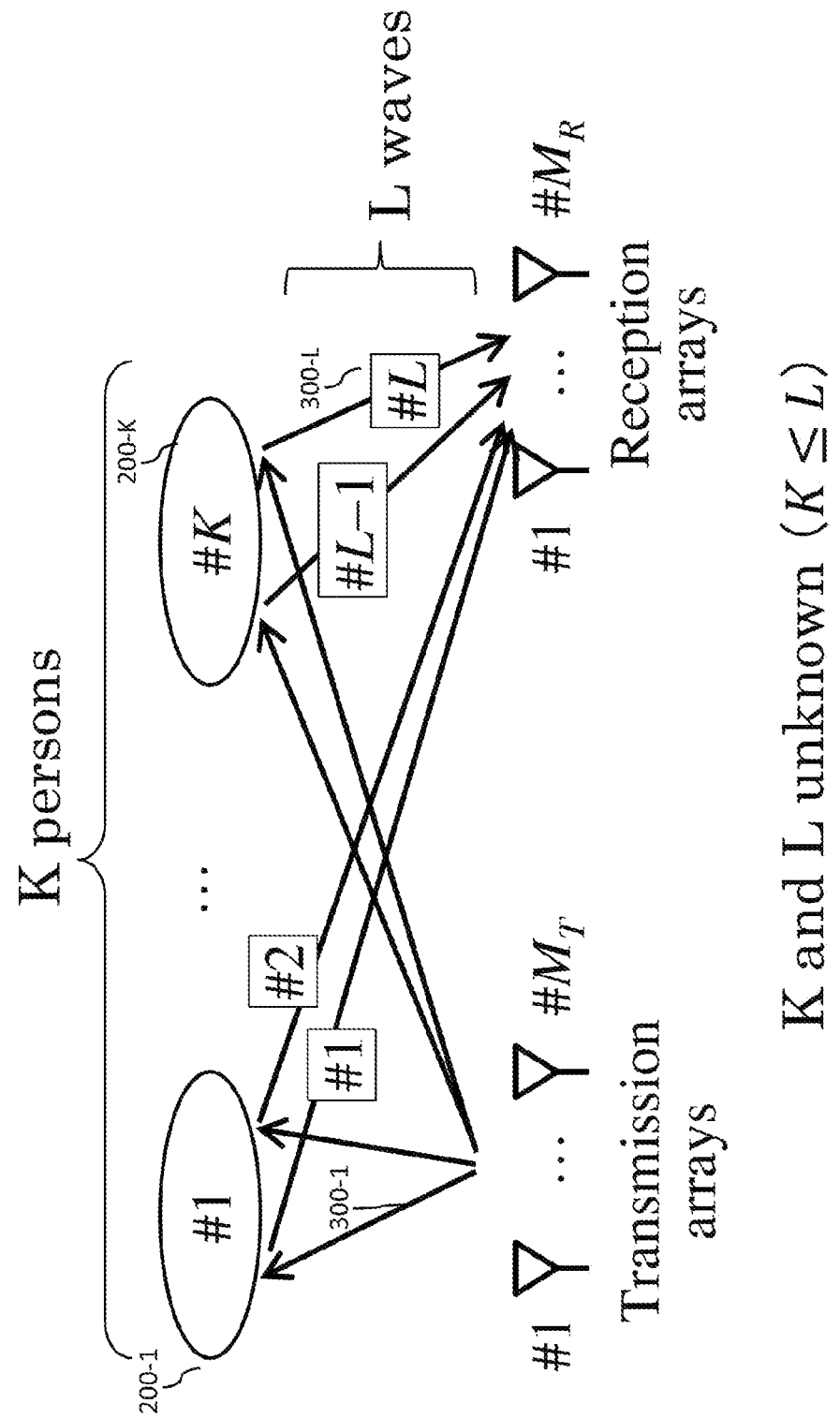
FIG. 2 is a conceptual diagram showing radio wave propagation according to Embodiment 1.

FIG. 2 shows a model of radio wave propagation from transmission antenna 12 to reception antenna 21 envisaged in the present embodiment. In the space, K living bodies are present, where K is an integer greater than or equal to 0, and L waves are reflected or scattered from the living bodies and received by the reception antenna. Stated differently, L propagation channels are present through which radio waves are transferred via the living bodies. Here, K is the number of persons to be estimated and L changes depending on propagation environment, and thus both K and L are unknown numbers.

Note that FIG. 1 shows the transmission device and the reception device that are disposed adjacent to each other, but the transmission device and the reception device may be disposed, for example, spaced apart from each other as shown in FIG. 2. Also note that a single antenna may serve both as the transmission antenna and the reception antenna. Also, the transmission antenna and the reception antenna may be shared use by hardware of a wireless device such as a Wi-Fi router and a slave unit.

[Living Body Component Extractor 40]

Living body component extractor 40 extracts, from signals observed at the reception array antenna of reception antenna 21, variation components that are time-varying components transmitted from transmission antenna 12. In addition to variations derived from noise, such variation components can include living body components that are signal components reflected or scattered from one or more living bodies 200. Living body component extractor 40 is also referred to as the variation component extractor.

More specifically, living body component extractor 40 records, in chronological order, complex transfer functions calculated by complex transfer function calculator 30. Here, chronological order is the order in which the signals are observed. Subsequently, living body component extractor 40 extracts signals that include specific variation components among variations in the complex transfer functions recorded in chorological order.

Example methods of extracting variation components include: a method of extracting only predetermined frequency components after transforming variation components into frequency domain components by, for example, Fourier transform, etc.; and a method of extracting variation components by calculating a difference between complex transfer functions of two different times. These methods remove the components of direct waves and reflected waves that are transferred via a fixed object. As a result, only the living body components transferred via living body 200 and noise remain. Using complex transfer functions equivalent to five seconds, for example, components between 0.3 Hz and 3 Hz are extracted to extract variation components that include respiratory components which are present even when the living body stays still.

Note that the present embodiment has described an example case of extracting 0.3 Hz to 3 Hz components. To extract components of a slower operation or a faster operation, however, extraction is simply required to be performed differently to extract frequency components corresponding to the desired operation.

In the present embodiment, the number of transmission antenna elements included in the transmission array antenna is $M_T$, and the number of reception antenna elements included in the reception array antenna is $M_R$. Stated differently, there are a plurality of transmission antenna elements and a plurality of reception antenna elements. As such, complex transfer functions corresponding to the transmission array antenna and the reception array antenna include a plurality of variation components. Such variation components are collectively referred to as a variation component channel matrix F(f) having M rows and N columns and represented as shown in Expression 1:

[Math. 1]

$$F(f) = \begin{pmatrix} F_{11}(f) & \cdots & F_{1N}(f) \\ \vdots & \ddots & \vdots \\ F_{M1}(f) & \cdots & F_{MN}(f) \end{pmatrix} \quad \text{(Expression 1)}$$

Note that each element $F_{ij}$ in the living body component complex transfer function matrix F(f) is an element obtained by extracting a variation component from each element $h_{ij}$ of complex transfer functions. Also, the living body component complex transfer function matrix F(f) includes functions of frequencies or difference periods similar to frequencies. Such functions include items of information corresponding to a plurality of frequencies.

[Correlation Matrix Calculator 50]

Correlation matrix calculator 50 reorders the elements of the variation component channel matrix with M rows and N columns calculated by living body component extractor 40. Through this, correlation matrix calculator 50 converts the living body component channel matrix into variation component channel vector $F_{vec}(f)$ with M×N rows and one column. A method of reordering the elements is, for example, as shown in Expression 1, but any operations for reordering matrix elements may be utilized and elements may be reordered into any orders.

[Math. 2]

$$F_{vec}(f) = \text{vec}[F(f)] = [F_{11}(f) \ldots F_{M1}(f) F_{12}(f) \ldots F_{M2}(f) \ldots F_{1N}(f) \ldots F_{MN}(f)]^T \quad \text{(Expression 2)}$$

Subsequently, the correlation matrix calculator calculates a correlation matrix from the variation component channel vector. More specifically, correlation matrix calculator 50 calculates correlation matrix R of the variation component channel vector including a plurality of variation components derived from living body 200 and noise in accordance with Expression 3.

[Math. 3]

$$R = E[F_{vec}(f) F_{vec}(f)^H] \quad \text{(Expression 3)}$$

In Expression 3, E[ ] represents an averaging operator and operator H represents complex conjugate transpose. Here, to calculate a correlation matrix, correlation matrix calculator 50 averages the variation component channel vector including a plurality of frequency components in the frequency direction. This enables the sensing that simultaneously uses items of information included in the respective frequencies.

[Noise Information Storage 60]

Figure 3:
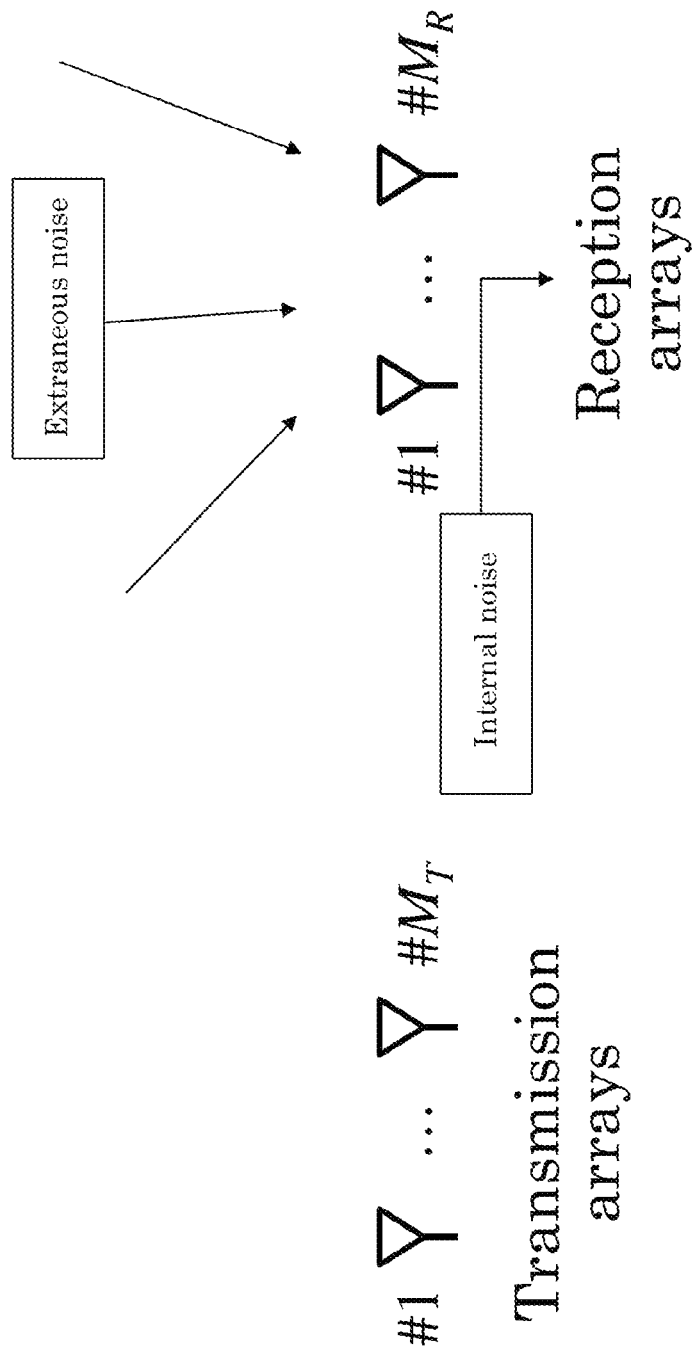
FIG. 3 is a conceptual diagram showing an environment in which a noise correlation matrix is measured in Embodiment 1.

Noise information storage 60 stores a correlation matrix, among correlation matrices calculated by correlation matrix calculator 50, that is obtained under a condition that corresponds to a state where no person is present, such as where no living body is present in a predetermined region to be measured. The following refers to such stored correlation matrix as noise correlation matrix $R_N$. FIG. 3 is a schematic diagram showing a propagation environment where no person is present. As shown in FIG. 3, reception antenna 21 receives only noise including extraneous noise and internal noise. Whether no person is present may be determined, for example, on the basis of whether a user is absent or by use of information on a time range in which no person is preliminarily known to be present. Alternatively, such determination may be made on the basis of the fact that power of the variation components is greater when a living body is present than when no living body is present. More specifically, the power of the variation components or the eigenvalues of the correlation matrix may be recorded in chronological order to determine that a correlation matrix is the one obtained in a state where no person is present, when power or an eigenvalue is lower than a predetermined threshold. Alternatively, a correlation matrix that corresponds to the minimum one obtained at a time in a predetermined period, such as one day, is the one obtained in a state where no person is present.

Note that when it is difficult to measure a state in which no person is present, a measurement result may be alternatively utilized that is obtained in a state where a body movement is relatively small such as when a person is asleep. Whether such measurement result can be an alternative may be made on the basis of the power of the variation components or the eigenvalues of the correlation matrix.

Even when being unable to be measured in the space in which sensor 1 is disposed, the noise correlation matrix may be measured by sensor 1 that is disposed in a space, where no person present, that is replicated as the space in which sensor 1 is to be disposed. In this case, it is desirable to correctly replicate as much as possible the distance between transmission device 10 and reception device 20 of sensor 1 and a positional relation between sensor 1 and a metal wall, etc. that well reflects radio waves.

Note that noise information storage 60 is simply required to store noise information derived from reception signals that are obtained under a condition that corresponds to a state where no person is present, and thus may store eigenvalues into which the correlation matrix is decomposed, instead of storing the correlation matrix.

[First Headcount Information Calculator 61]

First headcount information calculator 61 compares the correlation matrix calculated by the correlation matrix calculator and the noise correlation matrix stored by the noise information storage, thereby calculating first headcount information to be used by MUSIC spectrum calculator 70. Here, the first headcount information is an integer greater than or equal to 1 and less than $M_R \times M_T$. The correlation matrix calculated by the correlation matrix calculator is hereinafter referred to as target correlation matrix R to make a distinction from the noise correlation matrix. First headcount information calculator 61 decomposes each of the target correlation matrix and the noise correlation matrix into eigenvalues. The target correlation matrix is decomposed into:

$R = U \Lambda U^H$, $U = [u_1, \ldots, u_L, u_{L+1}, \ldots, u_{M_R \times M_T}]$, $\Lambda = \mathrm{diag}[\lambda_1, \ldots, \lambda_L, \lambda_{L+1}, \ldots, \lambda_{M_R \times M_T}]$, [Math. 4]

and noise correlation matrix is decomposed into:

$R_N = U_N \Lambda_N U_N^H$, $U_N = [u_{N1}, \ldots, u_{NL}, u_{NL+1}, \ldots, u_{NM_R \times M_T}]$, $\Lambda_N = \mathrm{diag}[\lambda_{N1}, \ldots, \lambda_{NL}, \lambda_{NL+1}, \ldots, \lambda_{NM_R \times M_T}]$ [Math. 5]

Note that the smallest one of the eigenvalues of the noise correlation matrix may be subtracted from each of the eigenvalues before processing. First headcount information calculator 61 compares the foregoing two correlation matrices, thereby calculating first headcount information. More specifically, in the present embodiment, first headcount information calculator 61 performs eigenvalue decomposition and then calculates noise power $P_w$ in accordance with Expression 4.

[Math. 6]

$P_W = \Sigma_{I=1} \lambda_{NI}$ (Expression 4)

Figure 4:
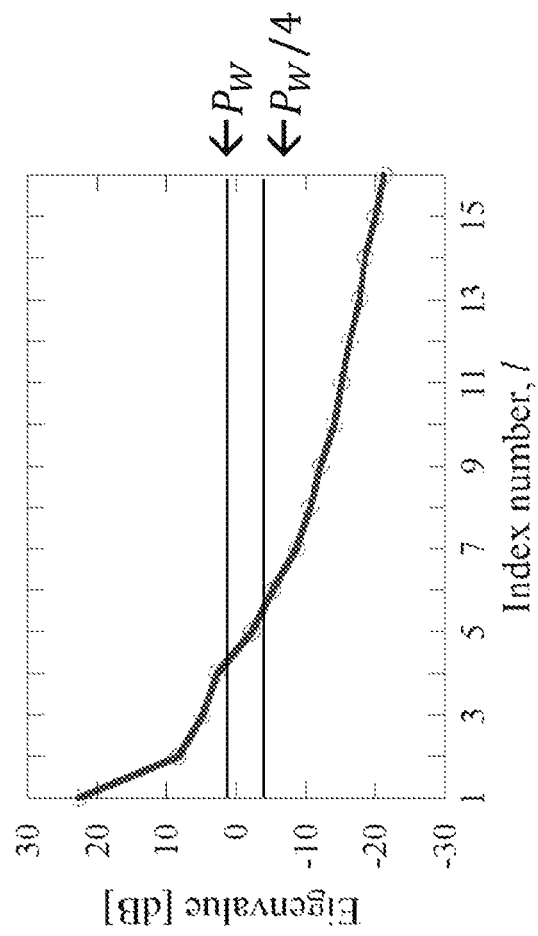
FIG. 4 is a graph showing an exemplary distribution of eigenvalues of a target correlation matrix according to Embodiment 1.

Note that the noise power may be obtained from a mean value or a sum of diagonal terms of the noise correlation matrix. Subsequently, first headcount information calculator 61 counts the number of ones of the eigenvalues in the target correlation matrix that are greater than or equal to a threshold, which is one of the noise power and the value obtained by dividing the noise power by a predetermined value. FIG. 4 shows an example of the eigenvalues of the target correlation matrix and noise power. In FIG. 4, the vertical axis indicates the magnitude of the eigenvalues and the lateral axis indicates the index numbers indicating the eigenvalues reordered in descending order. In FIG. 4, the graph line represented by circles indicates the eigenvalues of the target correlation matrix reordered in descending order, and the lateral lines indicate noise power $P_w$ and $P_w/4$ serving as thresholds. Here, the reason of dividing the noise power by 4 is because reception antenna 21 includes four elements, and thus such division gives the value per one element. Here, the use of $P_w$ as a threshold results in the first headcount information of 4, whereas the use of $P_w/4$ as a threshold results in the first headcount information of 5. Note that the first headcount information obtained by the foregoing steps may be added with a small value such and 1 or 2 to be the final first headcount information.

Note that in addition to using a total sum of Expression 4, a total sum of some of the eigenvalues may also be used on the basis of Expression 4.

Conventional MUSIC spectrum calculation assumes that the number of incoming waves is known beforehand and the present embodiment assumes that the number of persons is known beforehand. However, first headcount information calculator 61 calculates the first headcount information as a tentative number of persons, thus enabling MUSIC spectrum calculation.

[MUSIC Spectrum Calculator 70]

MUSIC spectrum calculator 70 corresponds to the likelihood spectrum calculator.

The correlation matrix calculated by correlation matrix calculator 50 is decomposed into:

$R = U \Lambda U^H$, $U = [u_1, \ldots, u_L, u_{L+1}, \ldots, u_{M_R \times M_T}]$, $\Lambda = \mathrm{diag}[\lambda_1, \ldots, \lambda_L, \lambda_{L+1}, \ldots, \lambda_{M_R \times M_T}]$, [Math. 7]

Here, $u_1, \ldots, u_{M_R \times M_T}$ [Math. 8]

is an eigenvector having $$M_R \times M_T \quad \text{[Math. 9]}$$

elements.

$$\lambda_1, \ldots, \lambda_{M_R \times M_T} \quad \text{[Math. 10]}$$

are eigenvalues corresponding to the eigenvector in the following order:

$$\lambda_1 \geq \lambda_2 \geq \ldots \geq \lambda_L \geq \lambda_{L+1} \geq \ldots \geq \lambda_{M_R \times M_T} \quad \text{[Math. 11]}$$

L represents the first headcount information calculated by first headcount information calculator 61.

Also, a steering vector (directional vector) of the transmission array antenna is defined as:

$$a_T(\theta_T) = [1, e^{-jkd \sin \theta_T}, \ldots, e^{-jkd(M_T-1)\sin \theta_T}]^T \quad \text{[Math. 12]}$$

and a steering vector (directional vector) of the reception array antenna is defined as:

$$a_R(\theta_R) = [1, e^{-jkd \sin \theta_R}, \ldots, e^{-jkd(M_R-1)\sin \theta_R}]^T \quad \text{[Math. 13]}$$

Here, k indicates the number of waves. Further, a steering vector obtained by multiplying the foregoing steering vectors in consideration of angle information of both the transmission and reception array antennas is defined as:

$$a(\theta_T, \theta_R) = \text{vec}\{a_T(\theta_T) a_R^T(\theta_R)\} \quad \text{[Math. 14]}$$

MUSIC method is applied to such resulting steering vector.

Stated differently, on the basis of MUSIC method, MUSIC spectrum calculator 70 calculates spectra of evaluation function $P_{music}(\theta)$ shown in Expression 5, using the steering vector obtained by the multiplication.

[Math. 15]

$$P_{music}(\theta) = \frac{1}{\left| a^H(\theta_T, \theta_R)[u_{L+1}, \ldots, u_{M_R}] \right|^2} \quad \text{(Expression 5)}$$

Note that MUSIC spectra may be replaced by spectra obtained by Beamformer method or Capon method. It should be noted, however, that Beamformer method or Capon method is inferior to MUSIC method in terms of accuracy, and an individual use of the method cannot achieve estimation with high accuracy.

[Second Headcount Information Calculator 80]

Second headcount information calculator 80 calculates second headcount information that is the number of living bodies that are present in a target region, on the basis of the MUSIC spectra calculated by MUSIC spectrum calculator 70. MUSIC spectra that are calculated using a correct number of persons typically exhibit the number of peaks equivalent to the correct number of persons. The present embodiment calculates MUSIC spectra using first headcount information that is greater than the correct number of persons, as a result of which virtual images appear as peaks even when no living body is actually present. To cope with this, second headcount information calculator 80 identifies peaks that are not virtual images among the peaks in the MUSIC spectra. Example methods of calculating the second headcount information include: a method that uses a ratio approach for peak values in the spectra; a method of counting the number of blocks in the MUSIC spectra in which regions where values greater than or equal to a predetermined threshold continuously appear; and a method that uses machine learning such as a convolutional neural network, using the MUSIC spectra as images. The present embodiment will describe an exemplary method that uses a ratio approach to calculate the second headcount information.

Figure 5:
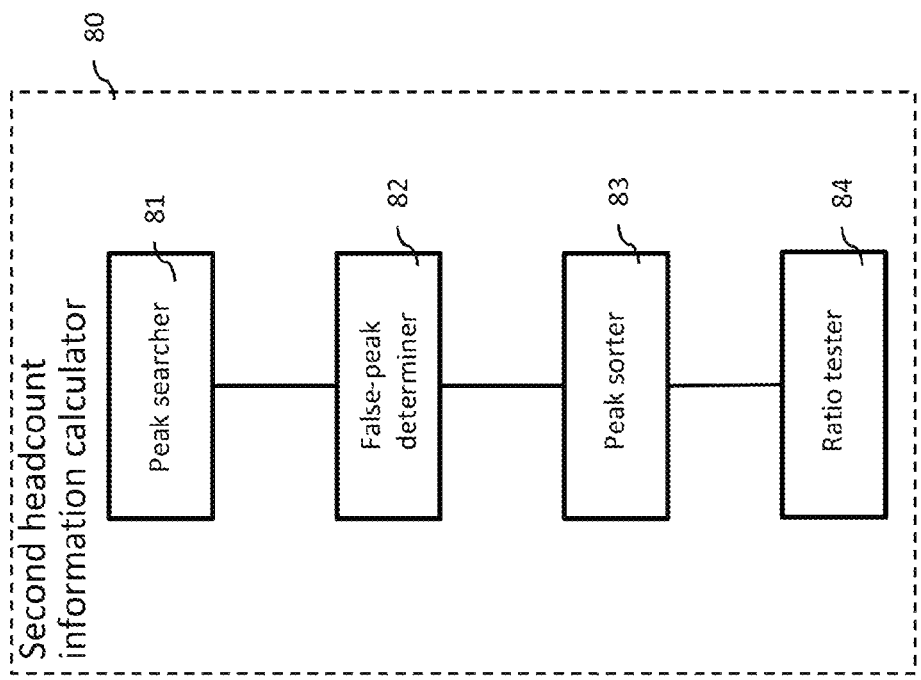
FIG. 5 is a block diagram showing the configuration of a second headcount information calculator according to Embodiment 1.

FIG. 5 is a block diagram of second headcount information calculator 80 that calculates second headcount information using a ratio approach. Second headcount information calculator 80 includes peak searcher 81, false-peak determiner 82, peak sorter 83, and ratio tester 84.

<Peak Searcher 81>

Figure 6:
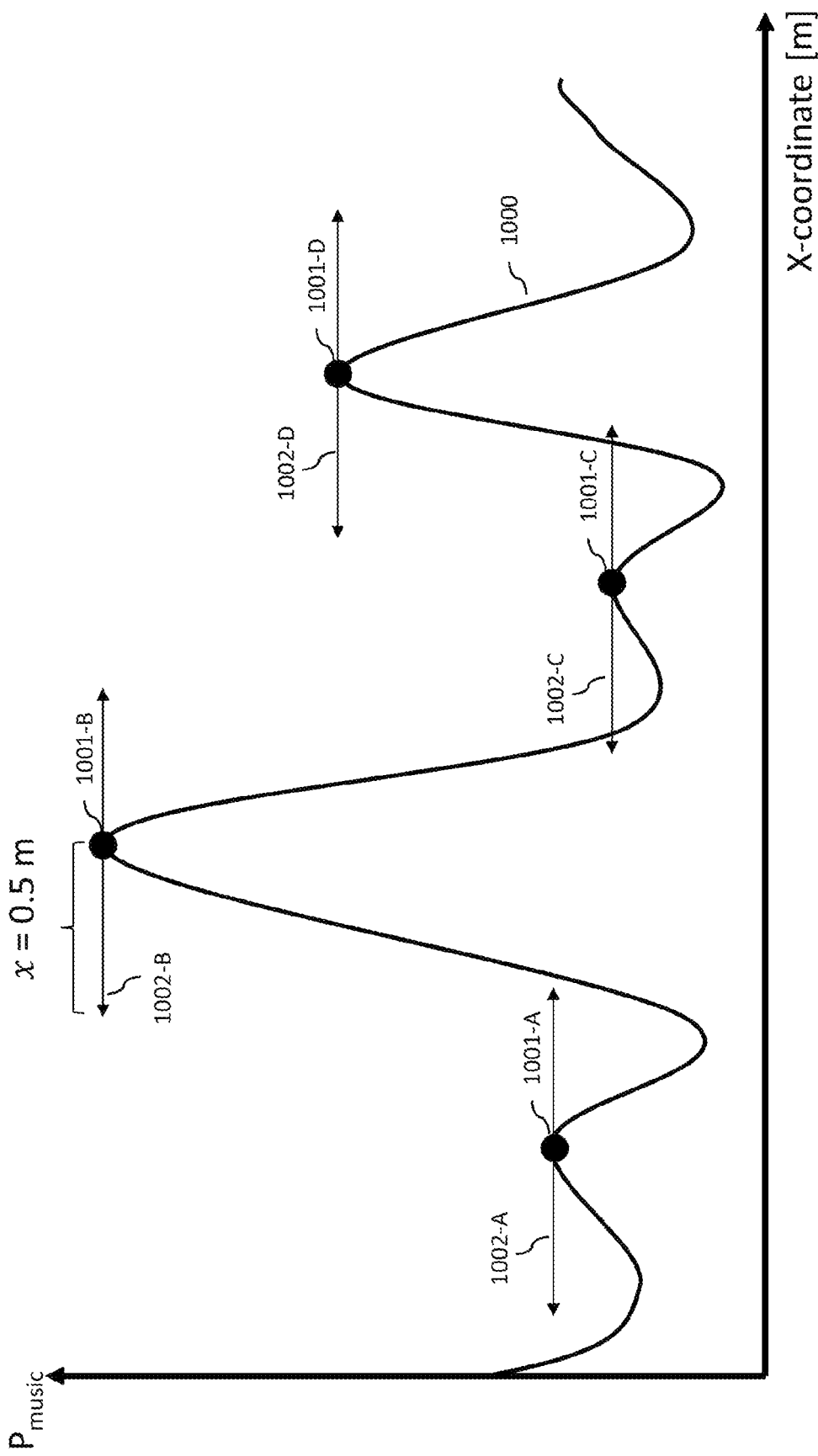
FIG. 6 is a conceptual diagram showing an operation performed by a peak searcher according to Embodiment 1.

Peak searcher 81 searches for peaks that take the local maximum values in the MUSIC spectra. A group of peaks found by the search is defined as a first peak group. To exclude small peaks derived from noise, peaks may be limited to the peaks each taking the maximum value in a predetermined range x. FIG. 6 is a conceptual diagram showing a process performed by peak searcher 81 using one-dimensional MUSIC spectra 1000. FIG. 6 shows four peaks of 1001-A, 1001-B, 1001-C, and 1001-D. Of these peaks 1002-A, 1002-B, 1002-C, and 1002-D, peaks that take the maximum value within a distance range of 0.5 m from the corresponding peaks are three peaks of 1001-A, 1001-B, and 1001-D. Peak searcher 81 extracts such three peaks 1001-A, 1001-B, and 1001-D from MUSIC spectra 1000 and groups the extracted peaks into the first peak group.

<False-Peak Determiner 82>

False-peak determiner 82 calculates an y % value of the value included in a predetermined range x from each of the peak values included in the first peak group. False-peak determiner 82 extracts peaks whose difference or ratio from the y % value is greater than or equal to a predetermined threshold z, and groups the extracted peaks into a second peak group. This enables false-peak determiner 82 to exclude relatively gentle peaks among the peaks included in the first peak group. When the predetermined range x is 0.5-m radius, y is 70%, and z is 0.4 dB, for example, false-peak determiner 82 extracts only values that are larger by 0.4 dB or greater than the 70% value of the value included within the range of 0.5-m radius from each of the peak values included in the first peak group.

<Peak Sorter 83>

Peak sorter 83 reorders the peak values included in the second peak group in descending order. Note that the peak sorter may add, to the second peak group, the value that is smaller by w than the smallest value among the peak values included in the second peak group, as a virtual peak. For example, when w is set to 3.4 dB and the smallest peak is −3 dB with respect to the maximum peak, a virtual peak to be added is −6.4 dB with respect to the maximum peak.

<Ratio Tester 84>

Figure 7:
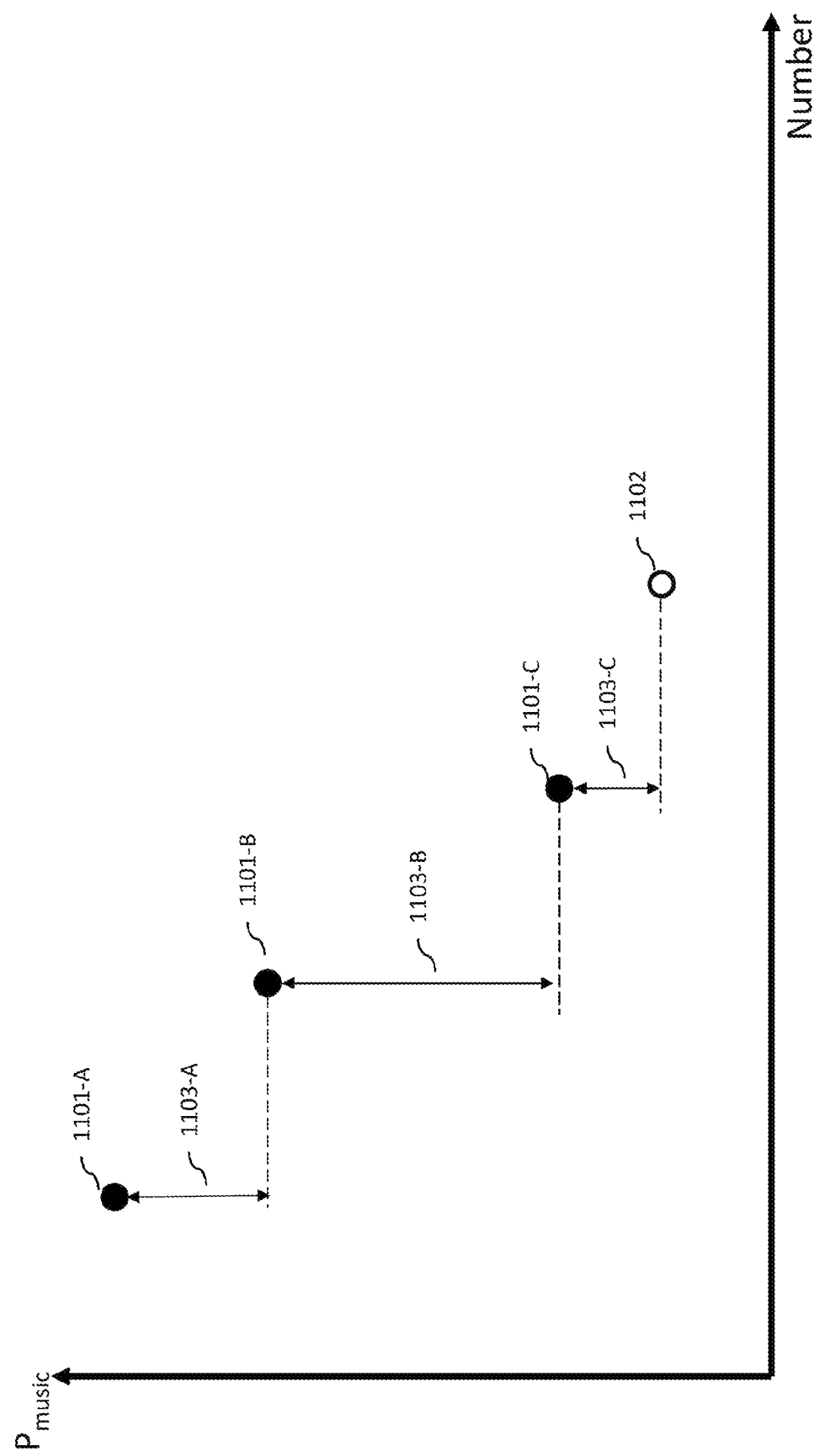
FIG. 7 is a conceptual diagram showing an operation performed by a ratio tester according to Embodiment 1.

Ratio tester 84 calculates a ratio between adjacent peak values in the second peak group reordered by peak sorter 83, thereby estimating second headcount information. More specifically, ratio tester 84 calculates a ratio or a difference between the i-th peak and the i+1-th peak in the second peak group reordered in descending order, and outputs, as the second headcount information, "i" that gives the largest ratio or difference. Here, "i" is an integer greater than or equal to 1 and less than or equal to the number of elements included in the second peak group. FIG. 7 is a conceptual diagram showing a process performed by ratio tester 84. FIG. 7 shows elements included in the second peak group, 1101-A, 1101-B, 1101-C, and 1102 reordered in descending order according to the peak values. Note that peak 1102 is a virtual peak added by peak sorter 83. Peak searcher 81 calculates differences between adjacent peaks in the second peak group, 1103-A, 1103-B, and 1103-C, to determine a combination of peaks that gives the largest difference. In an example shown in FIG. 7, the largest difference is difference 1103-B, i.e., the difference between the second peak 1101-B and the third peak 1101-C. As such, the second headcount information is calculated as 2.

Note that the present embodiment is intended for estimating the number of persons, and thus the sensor outputs the second headcount information. However, estimation of the position of a living body may be performed using MUSIC spectra, and the sensor may output the position information on the living body.

Note that the present embodiment uses, as an exemplary configuration, a multiple-input, multiple-output (MIMO) configuration having a plurality of transmission antennas and a plurality of reception antennas, but a single antenna configuration may be used for one of transmission and reception. In this case, the MUSIC spectra outputted by the MUSIC spectrum calculator is one-directional spectra, but it is still possible to estimate second headcount information by searching for peaks as in the case where MUSIC spectra are two-dimensional.

Note that a determination may be made on the basis of the magnitude of the maximum eigenvalue, power of variation components included in complex transfer functions, and the degree of correlation between the presence and the absence of persons only for the detection of the absence of persons, i.e., the detection of zero persons, and MUSIC spectrum calculation by MUSIC spectrum calculator 70 may be performed only for the case where any persons are present. This saves the process required to calculate MUSIC spectra, when no person is present.

[Operation of Sensor 1]

Figure 8:
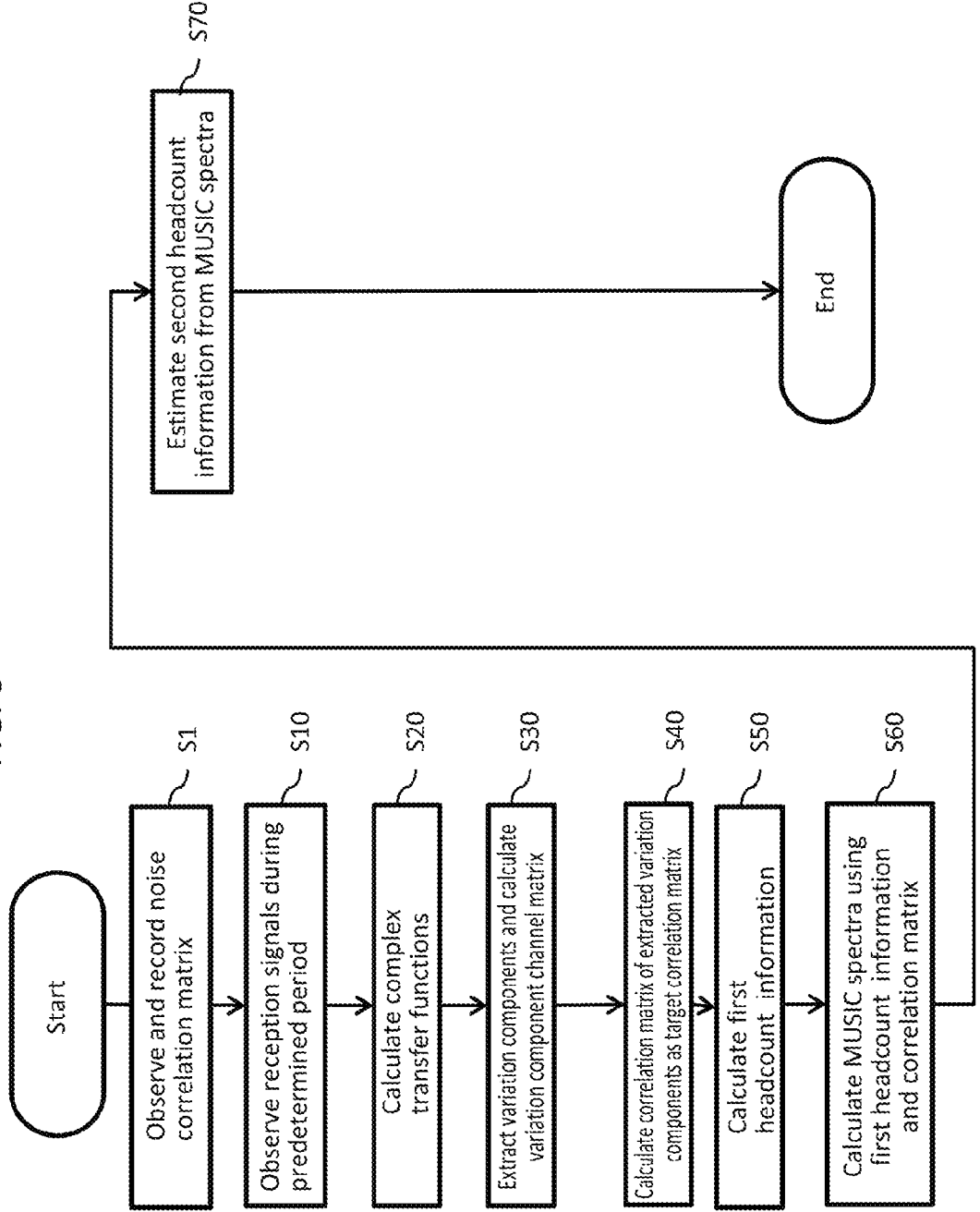
FIG. 8 is a flowchart of a process performed by the sensor according to Embodiment 1.

The following describes a process of estimating the number of living bodies performed by sensor 1 with the foregoing configuration. FIG. 8 is a flowchart of a process of estimating the number of living bodies performed by sensor 1 according to Embodiment 1.

Figure 9:
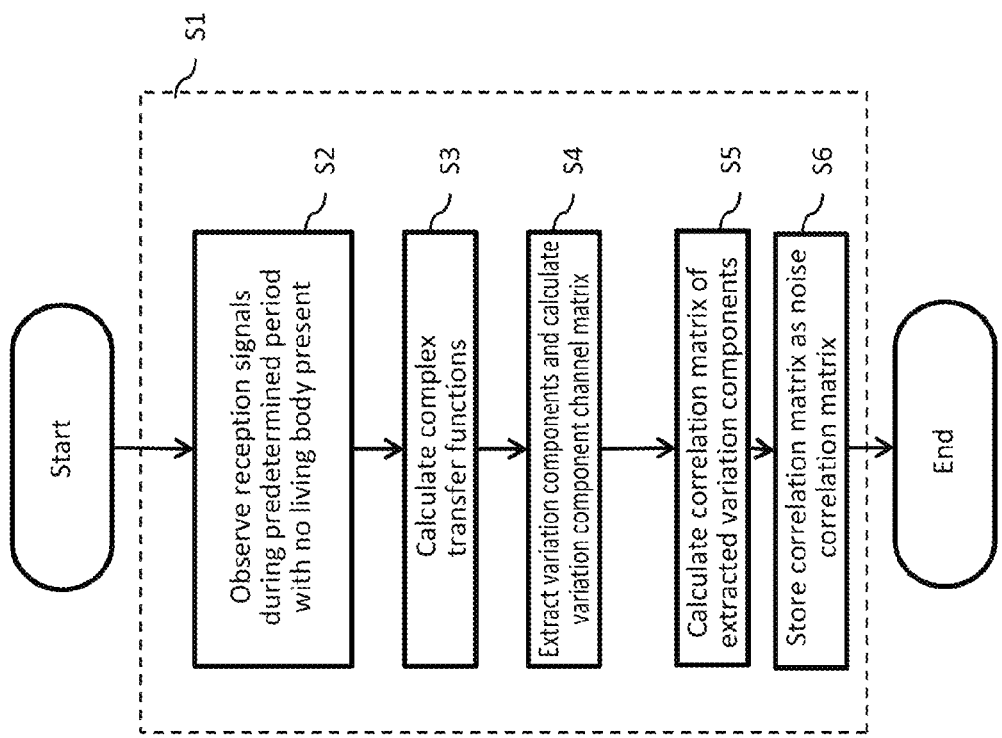
FIG. 9 is a flowchart of a process of storing the noise correlation matrix performed by the sensor according to Embodiment 1.

As shown in FIG. 8, sensor 1 first observes and records a noise correlation matrix (S1). With reference to the flowchart of FIG. 9, S1 will be described in detail. Reception device 20 observes reception signals during a predetermined period with no living body being present (S2). Subsequently, sensor 1 calculates complex transfer functions from the reception signals (S3). Sensor 1 then records the calculated complex transfer functions in chronological order, and calculates a variation component channel matrix by extracting variation components from the complex transfer functions recorded in chronological order (S4). Sensor 1 then calculates a correlation matrix of the extracted variation component channel matrix (S5). Finally, sensor 1 records, as a noise correlation matrix, the correlation matrix calculated in S5.

Figure 10:
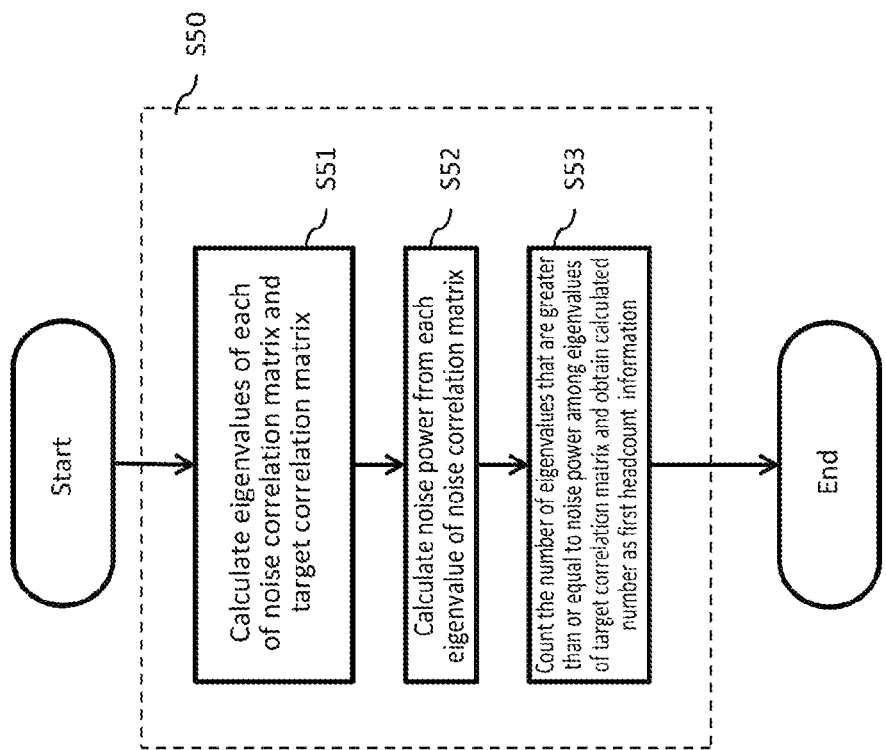
FIG. 10 is a flowchart of a process of calculating first headcount information performed by the sensor according to Embodiment 1.
Figure 11:
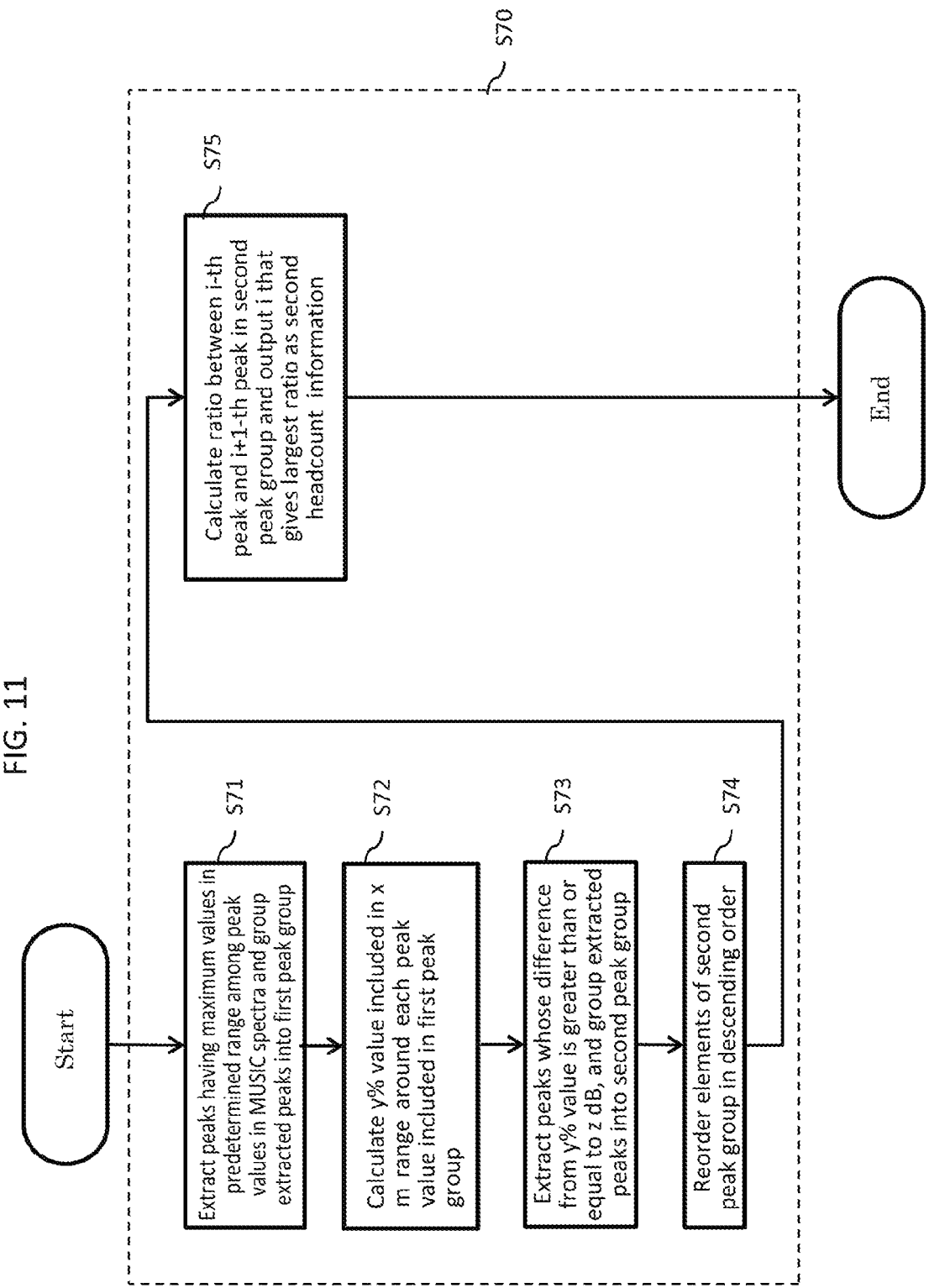
FIG. 11 is a flowchart of a process of calculating second headcount information performed by the sensor according to Embodiment 1.

The description returns to the flowchart of FIG. 8. Reception device 20 in sensor 1 then observes reception signals during a predetermined period (S10). Subsequently, sensor 1 calculates complex transfer functions from the reception signals (S20). Sensor 1 then records the calculated complex transfer functions in chronological order, and calculates a variation component channel matrix by extracting variation components from the complex transfer functions recorded in chronological order (S30). Subsequently, sensor 1 calculates, as a noise correlation matrix, a correlation matrix of the extracted variation component channel matrix (S40). Sensor 1 then calculates first headcount information by a predetermined method (S50). With reference to the flowchart of FIG. 10, the following describes in detail a method of calculating first headcount information. First, sensor 1 calculates eigenvalues of the noise correlation matrix and the target correlation matrix (S51). Subsequently, sensor 1 calculates noise power from the eigenvalues of the noise correlation matrix (S52). Finally, sensor 1 counts the number of ones of the eigenvalues of the target correlation matrix that are greater than or equal to the noise power to obtain the counted number as first headcount information (S53).

After that, sensor 1 calculates MUSIC spectra on the basis of the first headcount information calculated in S50 and the correlation matrix calculated in S40 (S60). Finally, sensor 1 calculates second headcount information from the MUSIC spectra calculated in S60, and outputs the second headcount information as the number of living bodies (S70). Example methods used in S70 include: a method that uses machine learning such as a convolutional neural network, using MUSIC spectra as images; a method of counting the number of blocks in MUSIC spectra in which regions where values greater than or equal to a predetermined value continuously appear; and a method that uses a ratio approach for the peak values in spectra.

With reference to the flowchart of FIG. 5, a method that uses a ratio approach will be described here. First, sensor 1 extracts, from the peaks in the MUSIC spectra, peaks each taking the maximum value in a predetermined range, and groups the extracted peaks into the first peak group (S71). Subsequently, sensor 1 calculates the y % value of the value included in a predetermined range around each of the peaks included in the first peak group (S72). Sensor 1 then extracts peaks whose difference from the y % value is greater than or equal to a predetermined threshold and groups the extracted peaks into the second peak group (S73). Sensor 1 then reorders the peak values included in the second peak group in descending order (S74). Finally, sensor 1 calculates a ratio or a difference between the i-th peak and the i+1-th peak in the second peak group, and outputs, as the second headcount information, "i" that gives the largest ratio or difference. Here, "i" is an integer greater than or equal to 1 and less than the number of elements included in the second peak group.

[Effects, Etc.]

Sensor 1 and the method of estimating the number of living bodies according to the present embodiment are capable of highly accurate estimation of the number of living bodies that are present by use of wireless signals. Further, sensor 1 according to the present embodiment is capable of accurate estimation of the position of a living body even when living body components cannot be sufficiently separated from noise by eigenvalue decomposition due to the presence of a large number of living bodies. More specifically, existing methods of estimating the number of persons by use of eigenvalues are feasible under a condition that the eigenvalues corresponding to noise and the eigenvalues corresponding to a living body are clearly separated from one another. In actuality, however, living body components are slightly superimposed on the noise components, which reduces the accuracy of the existing methods of estimating the number of living bodies. According to present invention, however, spectra are calculated by MUSIC method that utilizes the first headcount information that can be greater than the real number of persons, and only true peaks are extracted on the basis of the characteristics of false peaks among the peaks in the spectra. This enables the estimation of the number of persons even when the eigenvalues corresponding to noise and the eigenvalues corresponding to the living body are not sufficiently separated.

Embodiment 2

In Embodiment 1, first headcount information calculator 61 uses noise power calculated from the eigenvalues of the noise correlation matrix to calculate first headcount information. In Embodiment 2, a method will be described of calculating first headcount information using the maximum eigenvalue of the noise correlation matrix. Note that the configuration other than first headcount information calculator 61 is the same as that of Embodiment 1, and thus will not be described here.

First headcount information calculator 61 compares the correlation matrix calculated by the correlation matrix calculator and the noise correlation matrix stored by the noise information storage, thereby calculating first headcount information to be used by MUSIC spectrum calculator 70. Here, the first headcount information is an integer greater than or equal to 1 and less than $$M_R \times M_T \quad \text{[Math. 16]}$$

The correlation matrix calculated by the correlation matrix calculator is hereinafter referred to as target correlation matrix R to make a distinction from the noise correlation matrix. First headcount information calculator 61 decomposes each of the target correlation matrix and the noise correlation matrix into eigenvalues. The target correlation matrix is decomposed into:

$$R = U \Lambda U^H,$$

$$U = [u_1, \ldots, u_L, u_{L+1}, \ldots, u_{M_R \times M_T}],$$

$$\Lambda = \text{diag}[\lambda_1, \ldots, \lambda_L, \lambda_{L+1}, \ldots, \lambda_{M_R \times M_T}], \quad \text{[Math. 17]}$$

and the noise correlation matrix is decomposed into:

$$R_N = U_N \Lambda_N U_N^H,$$

$$U_N = [u_{N1}, \ldots, u_{NL}, u_{NL+1}, \ldots, u_{NM_R \times M_T}],$$

$$\Lambda_N = \text{diag}[\lambda_{N1}, \ldots, \lambda_{NL}, \lambda_{NL+1}, \ldots, \lambda_{NM_R \times M_T}] \quad \text{[Math. 18]}$$

Figure 12:
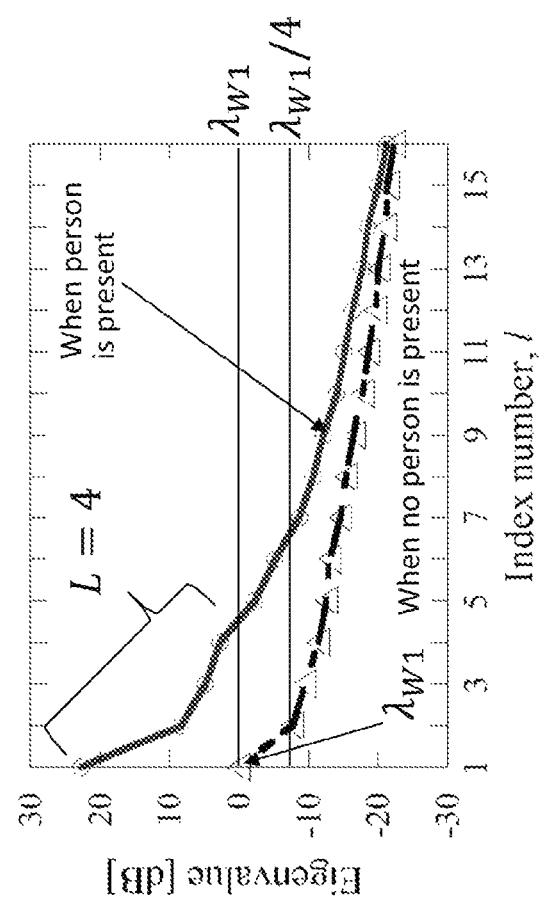
FIG. 12 is a graph showing an exemplary distribution of eigenvalues of the target correlation matrix and the noise correlation matrix according to Embodiment 2.

First headcount information calculator 61 compares the foregoing two correlation matrices, thereby calculating first headcount information. More specifically, first headcount information calculator 61 in the present embodiment performs eigenvalue decomposition, and then calculates a threshold $\lambda_{N1}$, which is the maximum one of the eigenvalues of the noise correlation matrix. Subsequently, first headcount information calculator 61 counts the number of eigenvalues that are greater than the threshold $\lambda_{N1}$ among the eigenvalues of the target correlation matrix. Note that the threshold $\lambda_{N1}$ may be a value obtained by increasing or decreasing at a ratio, or by adding or subtracting a certain value. FIG. 12 shows an example of eigenvalues of the target correlation matrix and noise power. In FIG. 12, the graph line represented by circles indicates the eigenvalues of the target correlation matrix reordered in descending order, and the graph line represented by triangles indicates the eigenvalues of the noise correlation matrix reordered in descending order. The lateral line indicates the threshold $\lambda_{N1}$. In an example shown in FIG. 12, the first headcount information is 4. Note that the first headcount information obtained by the foregoing steps may be added with a small value such as 1 and 2 to be the final first headcount information.

[Effects, Etc.]

The sensor according to Embodiment 2 reduces the amount of computation to be performed by the first headcount information calculator compared to the sensor according to Embodiment 1. This lowers the capability standard for a processing device that is required for real-time processing, thus enabling low-cost estimation of the number of persons.

The following describes a method of setting an appropriate threshold and an estimation accuracy of the sensor according to the present embodiment on the basis of the result of an experiment on the success rates of estimating the number of persons, using various values as a threshold to be used by the first headcount information calculator.

Figure 13:
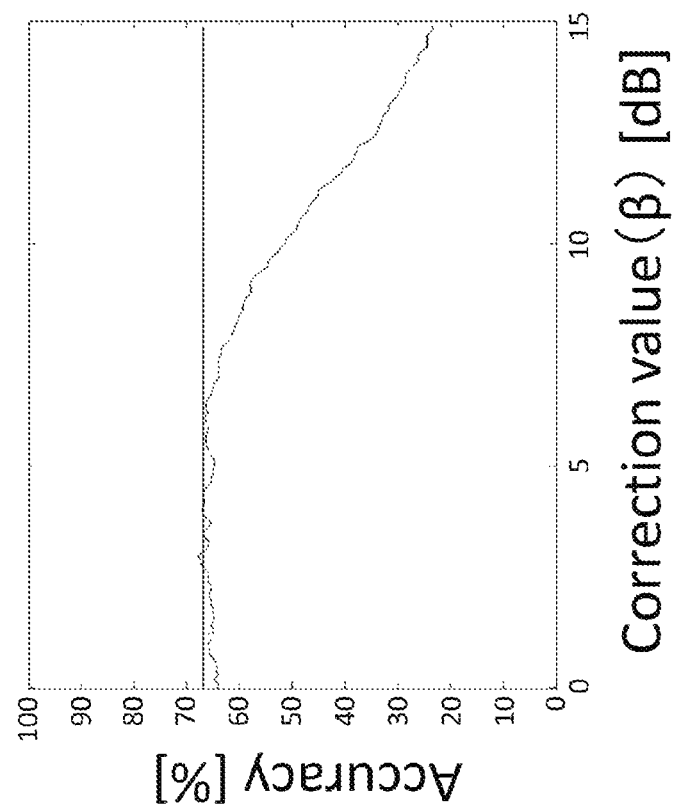
FIG. 13 is a graph showing success rates of estimating the number of persons that represent an experiment result in Embodiment 2.

First, conditions for this experiment will be presented. The transmission antenna and the reception antenna used were four-element patch arrays supporting the center frequency of 2.47125 GHz. CWs in the same frequency were used as transmission waves. To measure a variation component channel matrix, the transmission antenna and the reception antenna were disposed in a 4 m-square region with a 4-m spacing therebetween. The experiment was conducted in a state where no person is present to measure a noise correlation matrix and in respective states where one subject is present, two subjects are present, and three subjects are present to estimate the number of persons. On the basis of the results of such measurements, the success rates of estimating the number of persons by use of the threshold $\lambda_{N1}$ to which various values were added as β. FIG. 13 shows the result. In FIG. 13, the lateral axis indicates β (correction value) to be added and the vertical axis indicates the success rate (accuracy) of estimating the number of persons by use of the corresponding β. The result shows that the accuracy is highest when β is set to around 5 dB, in which case the success rate of estimating the number of persons is about 70%. Note that the result of the experiment is an example, and thus the optimal value can change depending on, for example, the number of antenna elements to be used.

One or more aspects have been described above on the basis of the embodiments, but the present invention is not limited to these embodiments. The one or more aspects may also include a variation achieved by making various modifications to the embodiments that can be conceived by those skilled in the art without departing from the essence of the present invention and an embodiment achieved by combining elements included in different embodiments.

INDUSTRIAL APPLICABILITY

The present invention is applicable for use in a measurement device that measures the number and positions of living bodies, a home appliance that performs control in accordance with the number and positions of living bodies, a surveillance device that detects the intrusion of a living body, and so forth.

REFERENCE SIGNS LIST 1 sensor
10 transmission device
11 transmitter
12 transmission antenna
20 reception device
21 reception antenna
22 receiver
30 complex transfer function calculator
40 living body component extractor
50 correlation matrix calculator
60 noise information storage
61 first headcount information calculator
70 MUSIC spectrum calculator
80 second headcount information calculator
81 peak searcher
82 false-peak determiner
83 peak sorter
84 ratio tester
200, 200-1, 200-K living body 300-1, 300-L propagation channel
1000, 2100 MUSIC spectrum
1001-A, 1001-B, 1001-C, 1001-D peak of MUSIC spectra
1002-A, 1002-B, 1002-C, 1002-D predetermined region around each peak
1101-A, 1101-B, 1101-C peak included in the second peak group
1102 virtual peak
1103-A, 1103-B, 1103-C difference between adjacent peaks

The invention claimed is:

1. A sensor that estimates a total number of living bodies, the sensor comprising:
   a complex transfer function calculator that calculates complex transfer functions from reception signals that are signals transmitted in a predetermined space from a transmission device including N transmission antenna elements, where N is a natural number greater than or equal to 2, and received during a predetermined period by M reception antenna elements, where M is a natural number greater than or equal to 2;
   a variation component extractor that extracts living body information that is a variation component in the predetermined space;
   a correlation matrix calculator that calculates a target correlation matrix from the living body information extracted by the variation component extractor;
   a noise information storage that records a noise correlation matrix measured in the predetermined space;
   a first headcount information calculator that calculates a threshold from the noise correlation matrix and calculates first headcount information by using, as a tentative value of the total number of living bodies that are present in the predetermined space, a total number of eigenvalues being greater than or equal to the threshold in the target correlation matrix;
   a likelihood spectrum calculator that estimates a plurality of candidates for positions of the living bodies by a predetermined position estimation method, using the first headcount information and the target correlation matrix, and outputs likelihood spectra indicating likelihoods of the respective living bodies present in corresponding ones of the positions; and
   a second headcount information calculator that estimates, by a predetermined method, second headcount information or positions from position information that is based on the likelihood spectra and can include the plurality of candidates for the positions, the second headcount information being a more accurate number of living bodies.

2. The sensor according to claim 1, wherein the first headcount information calculator calculates the first headcount information based on eigenvalues of the target correlation matrix and eigenvalues of the noise correlation matrix.

3. The sensor according to claim 2, wherein the first headcount information calculator outputs, as the first headcount information, a total number of eigenvalues that are greater than the threshold, the eigenvalues being obtained by decomposing the target correlation matrix.

4. The sensor according to claim 1, wherein the noise correlation matrix is a correlation matrix measured from the reception signals that are measured under a condition that corresponds to a state where no person is present in the predetermined space.

5. The sensor according to claim 1, wherein the first headcount information calculator uses, as the threshold, a maximum one of or a total sum of eigenvalues in the noise correlation matrix.

6. The sensor according to claim 1, wherein the threshold used by the first headcount information calculator is a value obtained by increasing or decreasing a maximum one of or a total sum of eigenvalues in the noise correlation matrix at a predetermined ratio.

7. The sensor according to claim 1, wherein the threshold used by the first headcount information calculator is a value obtained by adding or subtracting a predetermined value to or from a maximum one of or a total sum of eigenvalues in the noise correlation matrix.

* * * * *